United States Patent [19]

Chang

[11] Patent Number: 5,446,507
[45] Date of Patent: Aug. 29, 1995

[54] SPECTACLE FRAME FOR TELEMICROSCOPES AND THE LIKE

[75] Inventor: Byung J. Chang, Ann Arbor, Mich.

[73] Assignee: General Scientific Corporation, Ann Arbor, Mich.

[21] Appl. No.: 160,970

[22] Filed: Dec. 3, 1993

[51] Int. Cl.⁶ .................................................. G02C 1/00
[52] U.S. Cl. ..................................... 351/158; 351/57; 351/124
[58] Field of Search ................. 351/158, 124, 125, 57, 351/58, 59, 63, 83, 136, 137, 138; 359/411, 409

[56] References Cited

U.S. PATENT DOCUMENTS

| | | |
|---|---|---|
| D. 84,362 | 6/1931 | Nerney . |
| D. 87,189 | 6/1932 | Baker . |
| D. 92,198 | 5/1934 | Pappert . |
| D. 92,199 | 5/1934 | Pappert . |
| D. 290,465 | 6/1987 | Levoy ............................... D16/117 |
| D. 302,168 | 7/1989 | Huang ............................... D16/113 |
| 2,110,459 | 3/1938 | Bodee ...................................... 88/43 |
| 2,142,287 | 12/1938 | Bouchard ............................... 88/49 |
| 2,773,422 | 12/1956 | Flynn ...................................... 88/41 |
| 3,601,478 | 8/1971 | Ramp ..................................... 351/89 |
| 3,846,017 | 11/1974 | Ferrell ................................... 351/106 |
| 4,540,238 | 9/1985 | Edwards .............................. 350/146 |
| 4,704,000 | 11/1987 | Pekar ................................... 350/145 |
| 4,865,438 | 9/1989 | Wada ................................... 351/158 |
| 4,971,429 | 11/1990 | Ishido .................................. 350/547 |
| 5,076,682 | 12/1991 | Pasfield ................................. 351/158 |

Primary Examiner—William L. Sikes
Assistant Examiner—Hung Xuan Dang
Attorney, Agent, or Firm—Gifford, Krass, Groh, Sprinkle, Patmore, Anderson & Citkowski

[57] ABSTRACT

An improved spectacle frame for use with a telemicroscope or similar optical instrument. The spectacle frame includes temple pieces which are angularly disposed with respect to the lenses mounted in the spectacle frame, nose pads which extend toward the tip of the user's nose, rather than the eyes, and a uniquely designed, elevated bridge assembly. Optionally, a second pair of conventionally mounted nose pads may be provided. These features combine to achieve a more favorable positioning of the telemicroscope with respect to both the lenses of the spectacles and the eyes of the user, both to maximize the field of view and to improve the pantoscopic angle, and also improve weight distribution to minimize chafing, soreness and fatigue.

9 Claims, 4 Drawing Sheets

SPECTACLE FRAME FOR TELEMICROSCOPES AND THE LIKE

FIELD OF THE INVENTION

The present invention concerns telemicroscopes and similar instruments and, more particularly to a pair of spectacle frames uniquely designed for supporting a telemicroscope or the like such that the telemicroscope is disposed in relation to the wearer's eyes to maximize the field of view, minimize aberrations in the user's down vision, and improve weight distribution.

BACKGROUND OF THE INVENTION

Telemicroscopic instruments are widely used for magnifying a work area during precision work such as delicate surgery, dental work, inspection of circuit board solder joints, assembly of miniature parts, and jewelry making. A typical telemicroscopic instrument includes a pair of telemicroscopic loupes which are adjustably mounted to an eyeglass frame or head mount. The telemicroscopic loupes combine the long working distance of the telescope with the high quality magnification of the microscope. This type of optical instrument provides the user with a magnified image of the work area with a field of view at about arms length. Hence, the wearer is able to coordinate the work being performed by the hands with what is being seen by the eyes. A Galilean type of telemicroscope is disclosed in copending patent application Ser. No. 08/093,839, filed Jul. 19, 1993 and assigned to the assignee of the present invention, the disclosure of which is hereby incorporated by reference.

As mentioned, the telemicroscope is typically mounted on either an eyeglass frame or special head mount. U.S. patent application Ser. No. 08/093,831, filed Jul. 19, 1993 and assigned to the assignee of the present invention, the disclosure of which is hereby incorporated by reference, discloses an ocular mounting assembly for mounting a telemicroscope upon a pair of conventional spectacle frames and permitting adjustment or positioning in five different ways. As can be seen in FIG. 2 of the referenced application, the spectacles to which the telemicroscope is mounted by means of the ocular mounting assembly is essentially conventional in construction. The ocular mounting assembly is mounted to the spectacle frame below the bridge piece thereof, and the eye glasses are positioned on the user's face in the usual manner.

Mounting the telemicroscope so that it depends from the bridge of the spectacle frame has certain disadvantages due to the positional relationship between the lenses of the telemicroscope, the lenses of the eye glasses, and the wearer's own eyes. In particular, the telemicroscope positioned thus is relatively far away from both the lenses of the spectacle's and the wearer's eyes, thus undesirably reducing the field of vision. Moreover, in a conventional pair of spectacle frames, the lens encircling rims of the frames and the lenses mounted therein are disposed almost perpendicularly to the temple pieces of the frames. This causes aberrations introduced by the lower portion of the eye glass lenses since the lenses of the telemicroscope are often disposed at an angle with respect to the lenses of the spectacles; thus, an optical axis defined between the wearer's eye and the microscope lenses will cross the plane of the eye glass lens at an undesirable, oblique angle.

Furthermore, the weight of a telemicroscope, camera or similar device can be considerable. In a conventional eyeglass frame, the weight is supported mainly on very small nose pads which are mounted on the face side of the frames. The pressure exerted on these packs frequently leads to chafing and soreness.

Clearly, there is a need for a redesigned spectacle frame which is relatively conventional in appearance, but permits the user of a telemicroscope or similar instrument to use such an instrument with optimum viewing results. In particular, there is a need for a redesigned spectacle frame which mounts the telemicroscope closer to the lenses of the spectacles and the wearer's own eyes. There is also a need for a redesigned frame which allows the telemicroscope to be disposed with an optical axis defined between the wearer's eye and the lenses of the telemicroscope to be more or less perpendicular to the lenses of the eye glasses so as to minimize aberrations in the user's down vision. There is a further need for a frame with improved weight distribution to minimize fatigue, chafing and soreness.

SUMMARY OF THE INVENTION

The invention described and claimed herein has been designed to overcome the deficiencies of the prior art noted above. It is an improved and redesigned spectacle frame particularly useful for mounting a telemicroscope, surgical telescope, pair of surgical loupes, camera, etc., thereto. The spectacle frame includes a pair of temple pieces for supporting said frame on the ears of a wearer, and a brow bar pivotally connected to each of the pair of temple pieces. The brow bar crosses the wearer's face above his eyes. A pair of lens encircling rims depend from the brow bar. An elevated bridge is disposed on said brow bar at a location medial said pair of depending rims for mounting a telemicroscope including at least a pair of eye pieces and a pair of respective objective lenses thereon.

In one preferred embodiment of the spectacle frame of the present invention, a nose pad member for supporting the frame on the opposite sides of the bridge of the nose of the wearer are reversely mounting on the lens encircling rims. That is, it is mounted such that it extends in a direction away from the temple pieces and toward the tip of the wearer's nose. Conventionally, nose pads are mounted on the rims such that they extend toward the user's eyes. As will be subsequently be explained in greater detail, this positioning of the nose pad member improves the weight distribution of the telemicroscope or other instrument over the frame and results in less fatigue, chafing and soreness. The reverse mounted nose pad member also permits the spectacles and telemicroscope carried thereon to be positioned closer to the user's eyes, thus greatly improving the field of view of the telemicroscope. The improved frames of the present invention may also be constructed with two nose pad members, one mounted in the standard manner and one mounted reversely. This embodiment greatly improves the weight distribution of frame, lenses, and instrument.

In another preferred embodiment of the present invention, the temple pieces are angularly disposed with respect to the pair of rims such that a plane coincident with lenses mounted in the rims is substantially perpendicular to optical axes defined between each of the wearer's eyes and the respective objective lens of the telemicroscope. Because the lenses are, thus, mounted substantially perpendicular to the optical axes, visual aberration is greatly minimized, even when the user is using the lower portions of the spectacle lenses. Also, the increased pantoscopic angle helps reduce the distance between the eye and the eye pieces of the telemicroscope and also increases the field of view.

BRIEF DESCRIPTION OF THE DRAWINGS

The following detailed description may best be understood by reference to the following drawings in which.

DETAILED DESCRIPTION OF THE DRAWINGS

Figure 1:
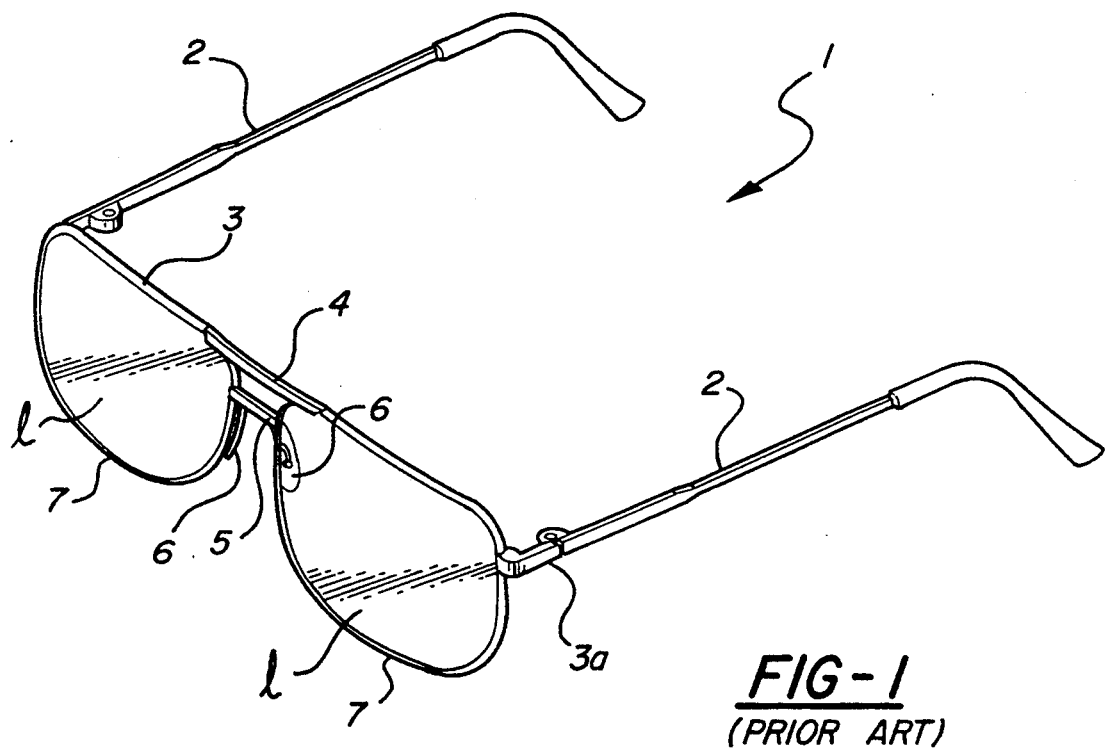
FIG. 1 is a perspective view of a prior art pair of spectacles to which may be mounted a telemicroscope.
Figure 3:
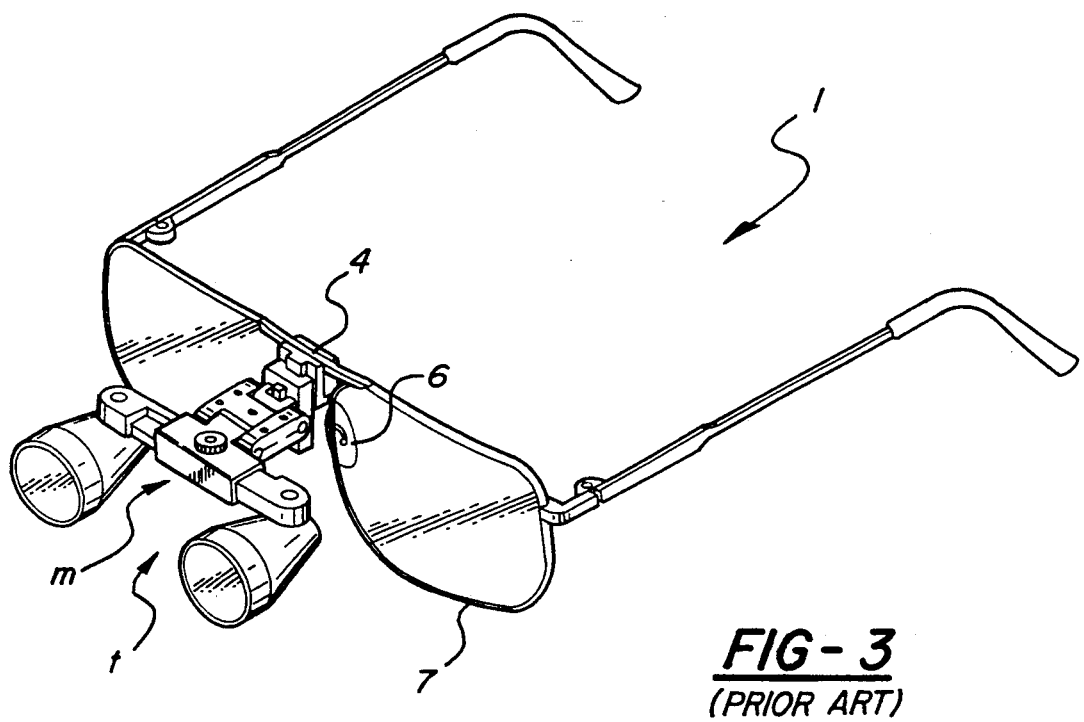
FIG. 3 is a perspective view similar to FIG. 1 showing a telemicroscope actually mounted to the prior art spectacle frame.

Throughout the following detailed description, like numerals are used to reference the same element of the prior art and the invention shown in multiple figures thereof. Referring now to the drawings, and in particular to FIGS. 1 and 3, there is shown a conventional, prior art spectacle frame 1 which may be used to mount a telemicroscope t (shown in FIG. 3) thereon. The spectacle frame 1 includes a pair of temple pieces 2 which are pivotally attached to a brow bar 3 which crosses the user's face at a location thereon just above the user's eyes. Conventionally, the brow bar 3 will include short side extensions 3a which extend around each side of the wearer's head. The brow bar 3 is, typically, attached to these extensions 3a. A pair of depending, lens encircling rims 7 have mounted therein a pair of lenses 1. A pair of nose pieces 6 are mounted on the depending rims 7 such that they extend toward the temple pieces and, consequently, the eyes of the user. A bridge 5 supports the spectacle frame 1 upon the nose of the user. This prior art spectacle frame 1 also includes a reinforcement piece 4 which helps to strengthen the brow bar 3 in the area above the bridge 5 so that the frame 1 can safely carry the weight of the telemicroscope t.

FIG. 3 depicts how the telemicroscope t is mounted to the prior art spectacle frame 1. A mount m such as is described in detail in U.S. patent application Ser. No. 08/093,831, mentioned earlier mounts the telemicroscope t on a location on the frame 1 between the reinforcement 4 and the bridge 5. Thus, as can most clearly be seen in FIG. 5, the entirety of the mount m and telemicroscope t are disposed below the top of the prior art frame 1.

Figure 2:
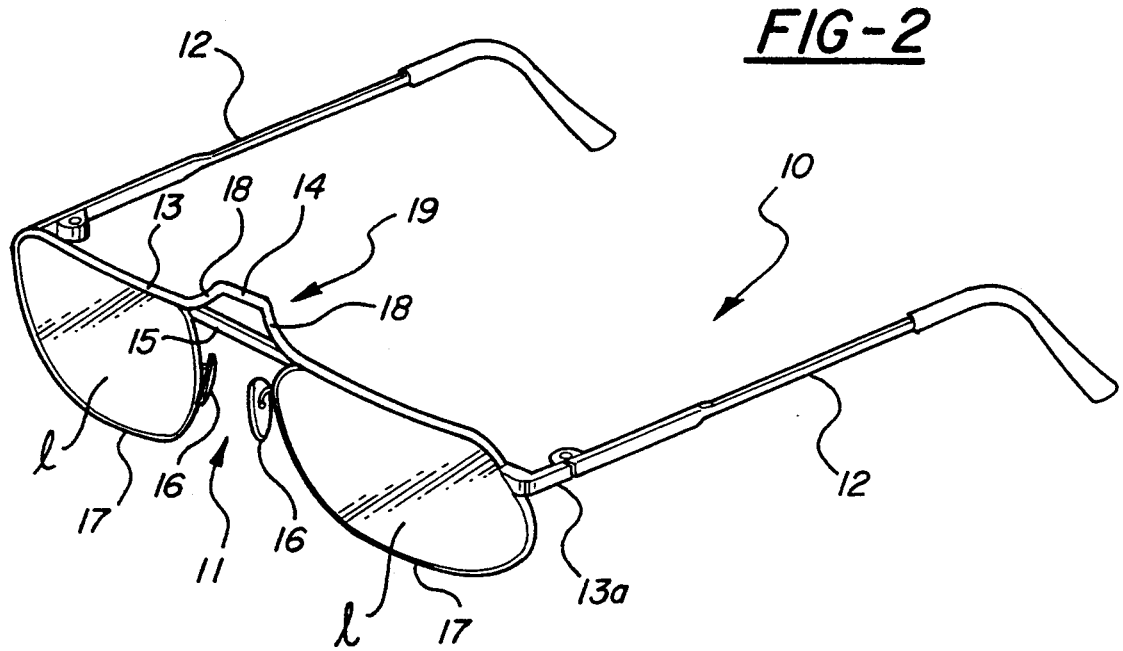
FIG. 2 is a perspective view of the improved spectacle frames of the present invention showing the various features thereof.
Figure 4:
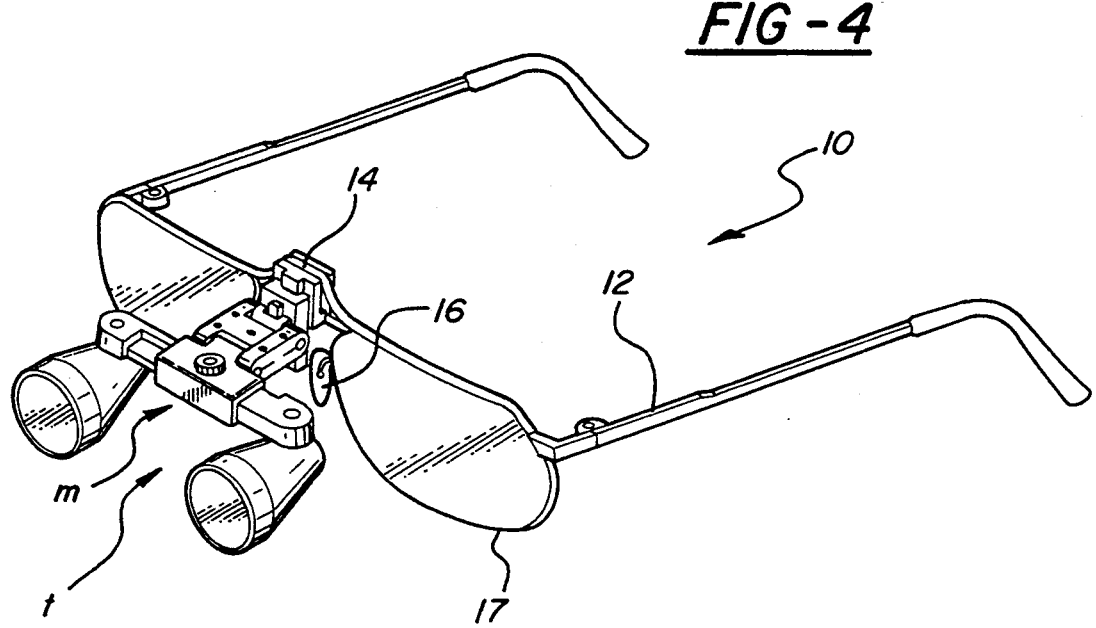
FIG. 4 is a perspective view similar to FIG. 2 showing a telemicroscope actually mounted to the spectacle frames of the present invention.
Figure 6:
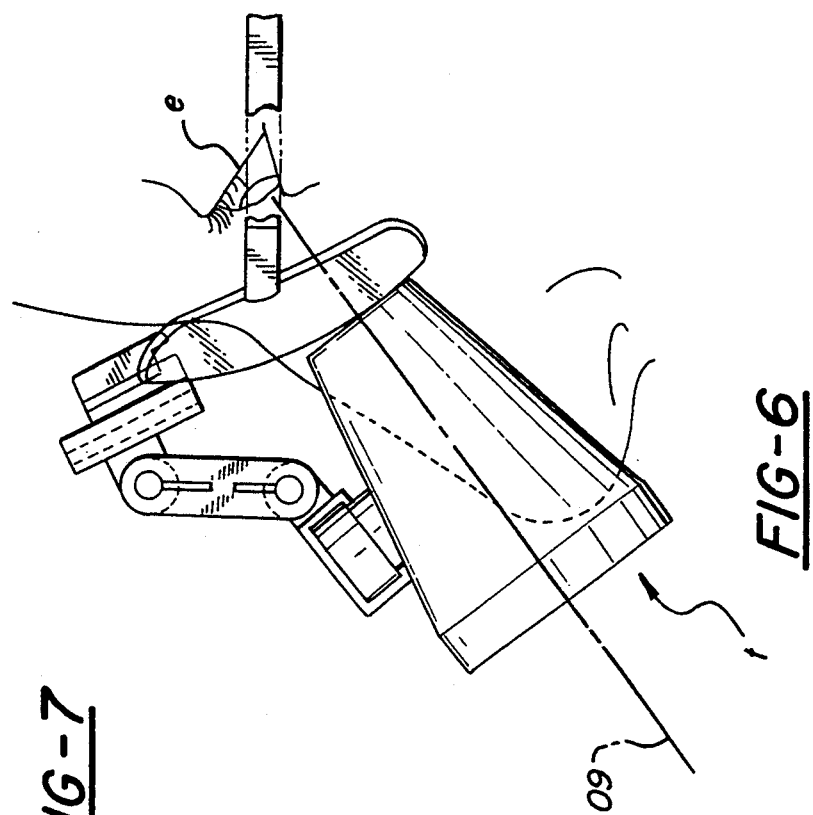
FIG. 6 is a side view of the improved spectacle frames of the present invention and attached telemicroscope positioned upon the face of a user with various hidden structures shown in phantom.
Figure 5:
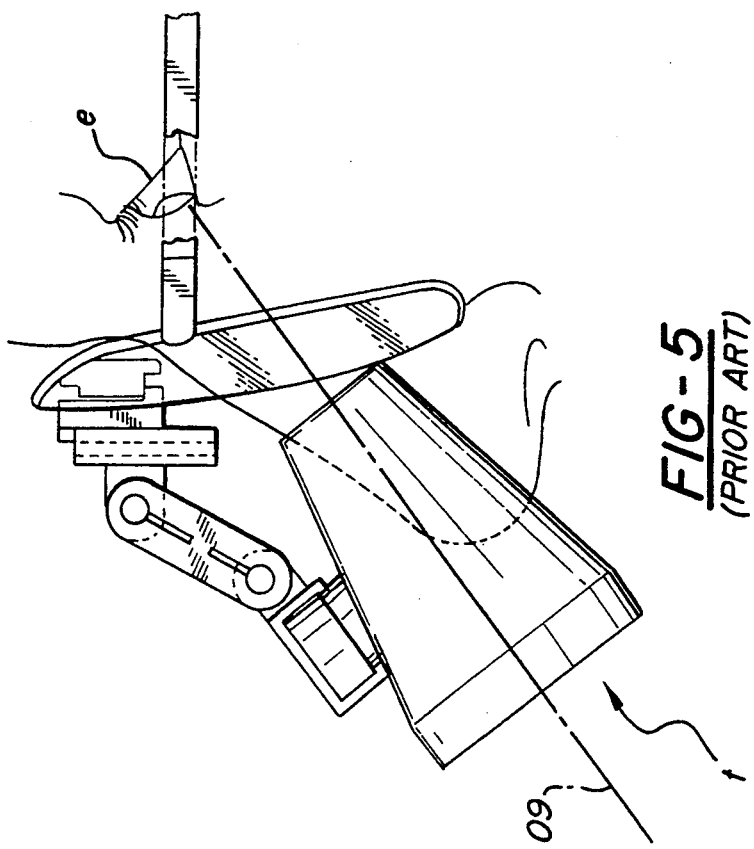
FIG. 5 is a side view of the prior art spectacle frame and attached telemicroscope positioned upon the face of a user, with various hidden structure shown in phantom.

FIGS. 2 and 4 depict the redesigned frame 10 of the present invention. Like the prior art frame 1, it also includes a pair of temple pieces, identified by the reference numeral 12, which are pivotally mounted to a brow bar 13 via side extensions 13a. Similarly, the frame of the present invention includes a pair of lens encircling rims 17 which depend from the brow bar 13. However, unlike the prior art frame 1, the temple pieces 12 are disposed at a considerable angle with respect to the lens encircling rims 17, as can best be seen in FIG. 6, which is a side view. A comparison of FIGS. 5 and 6 shows the decreased angular relationship between the temple pieces and rims (and, consequently, lenses 1 mounted therein) of the frames 10 of the present invention.

The frame 10 of the present invention includes an elevated bridge assembly 19 which supports the spectacle frame 10 on the nose of a user. Bridge assembly 19 further includes a raised element 14 which actually extends above the brow bar 13 and is connected thereto via tapering supports 18, and a cross-brace 15. Thus, the entire bridge assembly 19 of the frame 10 is elevated when compared to the corresponding structures 4, 5 of the prior art frame 1.

A nose pad member 11 in the form of a pair of nose pads 16 are reversely mounted on the lens encircling rims 17. That is, instead of being mounted so they extend rearwardly, as is true of the prior art frames, the nose pads 16 are mounted such that they extend forwardly toward the tip of the user's nose and in a direction opposite of the temple pieces 12. As can be seen by comparing FIGS. 5 and 6, this permits the lenses 1 mounted in the spectacle frame 10 to be positioned considerably closer to the user's eye e. Furthermore, the reverse mounted nose pads 16 also improve the distribution of the weight of the frame 10 and telemicroscope t. Although depicted as a pair of opposed nose pads, the nose pad member 11 could also comprise a single string nose pad.

In an alternative embodiment (not depicted), the temple pieces 12 could be pivotally mounted on the lenses, or on a short extension attached thereto, and the rims could be eliminated. Thus, the nose pieces 16 would also be mounted directly to the lenses in the same position depicted in FIG. 2. Thus, the advantages of the present invention could be achieved in a rimless pair of spectacles, although such would not be as sturdy as the embodiment depicted.

FIG. 4 shows how the telemicroscope t is mounted onto the spectacle frames 10 of the present invention. The mount m, which is substantially similar to that depicted in detail in the '831 application discussed earlier, is attached to the frame 10 between the raised element 14 and the cross brace 15. As can be seen by comparing FIG. 6 with FIG. 5, this raises the position of the telemicroscope t, with several advantages accruing. In particular, the telemicroscope t can be positioned closer to the eye e, thus achieving a greater field of view. Furthermore, the telemicroscope t can be positioned so that its objective and eye piece lenses are more in parallel with the lenses mounted in the spectacles, with such parallel positioning also due to the aforementioned angular orientation of the lenses 1 with respect to the temple pieces 12. Thus, an optical axis oa defined by the eye of the user e and the lenses of the telemicroscope all intersect the lens of the spectacles at an angle which is much closer to 90° than is the case for the prior art frames shown in FIG. 5.

Figure 7:
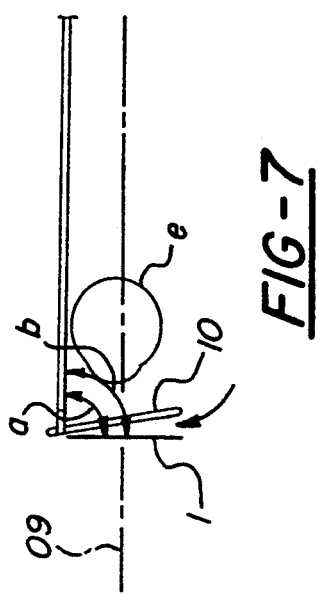
FIG. 7 is a comparison between the pantoscopic angle made by lenses mounted in, respectively, the prior art spectacle frame of FIG. 1 and the redesigned spectacle frame of FIG. 2 and the optical axes defined between the respective telemicroscope objective lens and the eye of a user.

FIG. 7 depicts schematically the pantoscopic angle b between the frame 10 of the present invention and the pantoscopic angle a of the prior art frame 1. As is readily apparent, angle b is much closer to 90° than angle a. Hence, the visual field seen through the telemicroscope mounted to the redesigned frames of the present invention will be much less aberrated than the corresponding field of vision seen through a comparable telemicroscope mounted on a conventional eye glass frame. This is particularly true in the lower portions of the lenses of the eye glasses, thus considerably enhancing the accuracy of down vision, which is very important when performing work telemicroscopically.

Figure 8:
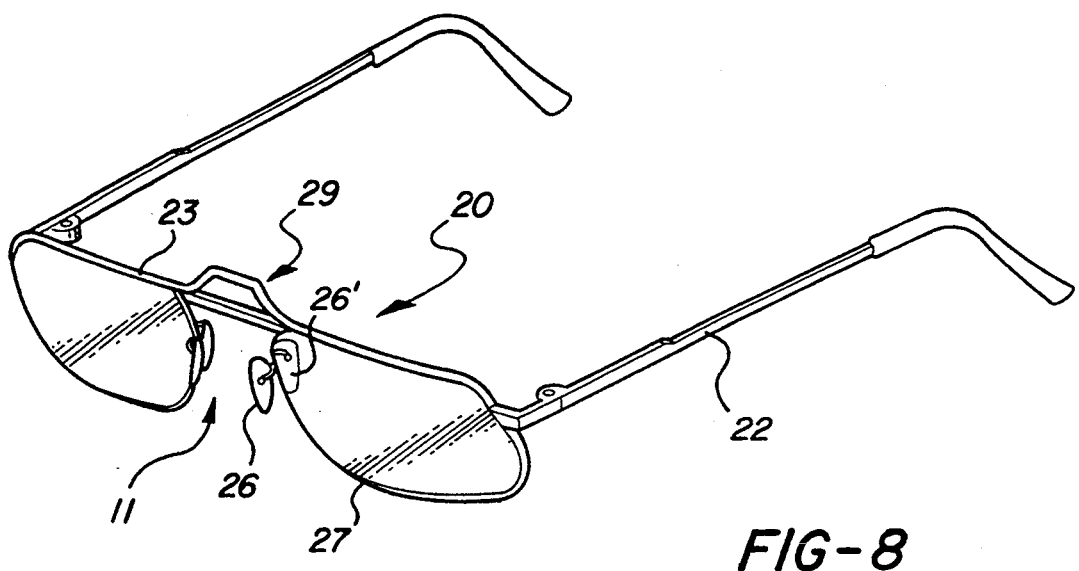
FIG. 8 is a perspective view of another embodiment of the frame of the present invention.
Figure 9A:
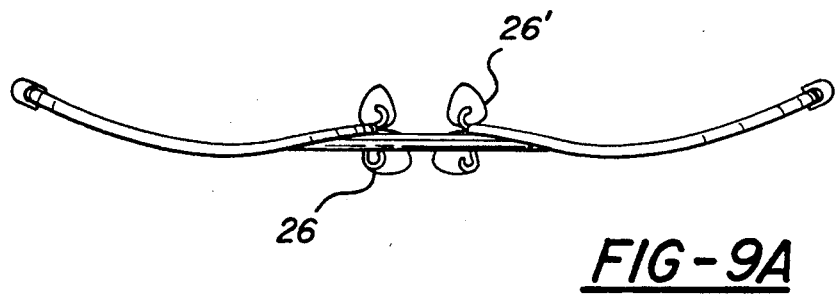
FIGS. 9a and 9b are, respectively, top and front views of the embodiment of FIG. 8 with the temple pieces removed.
Figure 9B:
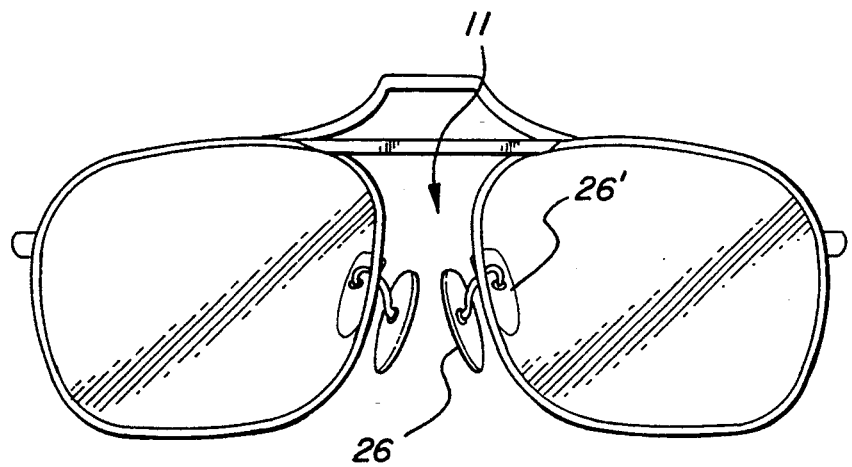

FIGS. 8-9b depict yet another embodiment 20 of the frame of the present invention. Frame 20 also includes brow bar 23, temple pieces 22, rims 27, and elevated bridge assembly 29. A nose pad member 11 in the form of a pair of reversely mounted nose pads 26 extend in a direction opposite the temple pieces in a manner similar to that of the frames 10 depicted in FIGS. 2, 4 and 6. Nose pad member 11 also includes a pair of nose pads 26' that are mounted in the standard manner; i.e., on the inside of the frame 20 to extend toward the wearer's nose. The double pair of nose pads 26, 26' greatly improve the weight distribution characteristics of the frames 20 and are much more comfortable. Again, the nose pad member 11 cold be a single string nose pad.

Frames 20 as depicted also include the features of the angled temple pieces and the elevated bridge. However, the double pair of nose pads may be advantageously employed with other frame designs, such as the prior art design depicted in FIGS. 1, 3 and 5.

Thus, a redesigned and improved spectacle frame suitable for mounting thereon a telemicroscope or similar instrument has been described with reference to certain exemplifications and embodiments thereof. The improved spectacle frame permits mounting of a telemicroscope thereon such that the user's field of view is considerably enlarged because of the closer positioning of the telemicroscope to the user's eyes, and is also freer of aberrations, particularly in the lower region, due to parallelism between the lenses of the spectacles and the lenses of the telemicroscope. Furthermore, the reverse mounted and/or double nose pad member also improves the weight distribution of the frames and optical instrument, thus minimizing chafing, soreness and fatigue. Doubtless, by carefully reviewing the present disclosure, one skilled in the art may design variations in the present invention, but such design variations are considered to be within the scope of the present invention. It is the claims, and all reasonable equivalents thereof, rather than the particular depicted exemplifications and embodiments, which define the true scope of the present invention.

I claim:

1. A spectacle frame in combination with a telemicroscope capable of having a pair of lenses mounted therein, said frame comprising:
   a pair of temple pieces for supporting said frame on the ears of a wearer;
   a brow bar interconnecting said pair of temple pieces and crossing the wearer's face above the eyes thereof, said brow bar having a pair of opposed ends, one of said ends being pivotally connected to one of said pair of temple pieces, and the other of said ends being pivotally connected to the other of said pair of temple pieces;
   a pair of lens encircling rims depending from said brow bar;
   an elevated bridge assembly disposed on said brow bar at a location medial said pair of depending rims for mounting a telemicroscope including a pair of objective lenses and a pair of eye piece lenses thereon; and
   a nose pad member for supporting said frame on opposite sides of the bridge of the nose of said wearer, said nose pad member being mounted on said rims and extending in a direction away from said temple pieces.

2. The spectacle frame of claim 1 wherein said temple pieces are angularly disposed with respect to said pair of rims such that a plane coincident with a pair of lenses mounted in said rims is substantially perpendicular to optical axes defined between each of said wearers eyes and the respective objective lens of the telemicroscope.

3. the frame of claim 1 wherein the elevated bridge assembly further includes an elevated bridge piece and a pair of tapering side supports connecting said bridge piece and said brow bar.

4. The frame of claim 1 wherein the brow bar further comprises a side extension formed at each end thereof and extending for a short distance around the sides of the wearer's head, said temple pieces being pivotally mounted to said side extensions.

5. The frame of claim 1 wherein said nose pad member is a single string nose pad.

6. The spectacle frame of claim 5 wherein said temple pieces are angularly disposed with respect to said pair of rims such that a plane coincident with a pair of lenses mounted in said rims is substantially perpendicular to optical axes defined between each of said wearer's eyes and the respective objective lens of the telemicroscope.

7. The frame of claim 1 wherein said nose pad member is a pair of opposed nose pads.

8. A spectacle frame in combination with a telemicroscope incapable of having a pair of lenses mounted therein, said frame comprising:
   a pair of temple pieces for supporting said frames on the ears of a wearer;
   a brow bar interconnecting said pair of temple pieces and crossing the wearer's face above the eyes thereof, said brow bar having a pair of opposed ends, one of said ends being pivotally connected to one of said pair of temple pieces, and the other of said ends being pivotally connected to the other of said pair of temple pieces;
   a pair of lens encircling rims depending from said brow bar; and
   an elevated bridge assembly disposed on said brow bar at a location medial said pair of depending rims for mounting a telemicroscope including a pair of objective lenses and a pair of eye pieces thereon.

9. The frame of claim 8 wherein said temple pieces are angularly disposed with respect to said pair of rims such that a plane coincident with a pair of lenses mounted in said rims is substantially perpendicular to optical axes defines between each of said wearer's eyes and the respective objective lens of the telemicroscope.

* * * * *